United States Patent
Chen et al.

(10) Patent No.: US 11,514,873 B1
(45) Date of Patent: Nov. 29, 2022

(54) METHOD OF ADJUSTING BRIGHTNESS OF DISPLAY DEVICE

(71) Applicant: ANPEC ELECTRONICS CORPORATION, Hsinchu (TW)

(72) Inventors: Te-Sheng Chen, Hsinchu (TW); Che-Chang Chang, Hsinchu County (TW); Yun-Li Liu, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 17/705,397

(22) Filed: Mar. 28, 2022

(30) Foreign Application Priority Data

Dec. 27, 2021 (TW) .................. 110148840

(51) Int. Cl.
*G09G 5/10* (2006.01)
*G09G 3/20* (2006.01)

(52) U.S. Cl.
CPC ............ *G09G 5/10* (2013.01); *G09G 3/2022* (2013.01); *G09G 3/2044* (2013.01); *G09G 2310/08* (2013.01); *G09G 2320/064* (2013.01)

(58) Field of Classification Search
None
See application file for complete search history.

(56) References Cited

U.S. PATENT DOCUMENTS

| 5,589,805 | A | * | 12/1996 | Zuraski | H03K 7/08 318/599 |
|---|---|---|---|---|---|
| 6,445,790 | B1 | * | 9/2002 | Burgan | G10H 5/10 379/357.03 |
| 8,947,475 | B2 | * | 2/2015 | Clatanoff | G09G 3/2029 345/691 |
| 2002/0005861 | A1 | * | 1/2002 | Lewis | G09G 3/3406 345/691 |
| 2010/0027073 | A1 | * | 2/2010 | Lin | G09G 3/344 358/3.03 |
| 2012/0068978 | A1 | * | 3/2012 | Aitken | G09G 3/3406 345/207 |

* cited by examiner

*Primary Examiner* — Dorothy Harris
(74) *Attorney, Agent, or Firm* — Li & Cai Intellectual Property Office (57) ABSTRACT

A method of adjusting brightness of a display device is provided. The method includes steps of: generating a synchronization signal having a plurality of periods each of which is a frame time; determining bit values of dithering data according to target brightness data; and determining how many pulse waves in the pulse wave width modulation signal need to be modulated within the frame time according to the bit values of the dithering data, and accordingly modulating widths of the pulse waves of the pulse wave width modulation signal.

7 Claims, 5 Drawing Sheets

METHOD OF ADJUSTING BRIGHTNESS OF DISPLAY DEVICE

CROSS-REFERENCE TO RELATED PATENT APPLICATION

This application claims the benefit of priority to Taiwan Patent Application No. 110148840, filed on Dec. 27, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a display device, and more particularly to a method of adjusting brightness of the display device.

BACKGROUND OF THE DISCLOSURE

With the development of science and technology, various display devices are widely used in people's daily life. If the display devices intend to display images having desired brightness and desired colors in different environments, brightness of backlight units of the display devices must be adjusted for different ambient lighting conditions. The number of colors of the images that can be displayed on the display device depends on the number of grayscales supported by the display device. The grayscales represent brightness and darkness levels. Different brightness of primary colors is classified into different grayscales. The higher the grayscales that can be supported by the display device, the richer the colors that can be provided by the display device, the closer the images displayed on the display device can be to the desired brightness and desired colors, the finer the images displayed on the display device can be in detail, and the higher the resolutions of the images are; however, a higher internal frequency is also required for a processor.

SUMMARY OF THE DISCLOSURE

In response to the above-referenced technical inadequacies, the present disclosure provides a method of adjusting brightness of a display device. The method includes the following steps: generating a synchronization signal, wherein each of a plurality of periods of the synchronization signal is a frame time; determining bit values of dithering data according to target brightness data; determining a number of pulse waves in a pulse wave width modulation signal that are to be modulated within the frame time according to the bit values of the dithering data, and accordingly modulating widths of the pulse waves of the pulse wave width modulation signal; and driving one or more of a plurality of light-emitting components of the display device according to the pulse wave width modulation signal by a driver of the display device.

In certain embodiments, the method further includes the following steps: determining whether or not the number of pulse waves of the pulse wave width modulation signal within the frame time is larger than an integer multiple of $2^N$, wherein N represents the number of the bit values of the dithering data, in response to determining that the number of pulse waves of the pulse wave width modulation signal within the frame time is not larger than the integer multiple of $2^N$, not performing the following steps, and in response to determining that the number of pulse waves of the pulse wave width modulation signal within the frame time is larger than the integer multiple of $2^N$, performing the following steps; dividing the frame time into a plurality of sub-frame times according to the number of the bit values of the dithering data; and determining how many pulse waves in the pulse wave width modulation signal need to be modulated within each of the plurality of sub-frame times according to the bit values of the dithering data.

In certain embodiments, the method further includes the following step: after modulation is performed on part of the wave pulses of the pulse wave width modulation signal within a previous one of the plurality of sub-frame times, modulating another part of the pulse waves of the pulse wave width modulation signal within a next one of the plurality of sub-frame times according to the modulation performed within the previous one of the plurality of sub-frame time.

In certain embodiments, the method further includes the following steps: dividing a period of the pulse wave width modulation signal by a value of resolution data to calculate a dithering time; and modulating the widths of one or more of the pulse waves of the pulse wave width modulation signal according to the dithering time.

In certain embodiments, the method further includes the following step: extending a working period of each of the wave pulses that are to be modulated in the pulse wave width modulation signal by adding the dithering time to the working period of each of the wave pulses that need to be modulated.

In certain embodiments, the method further includes the following step: determining which one or more of the wave pulses of the pulse wave width modulation signal need to be modulated, according to the bit values of dithering data and a sequence of the wave pulses of the pulse wave width modulation signal.

In certain embodiments, the method further includes the following step: determining to modulate some of the wave pulses that appear one after another in the pulse wave width modulation signal.

As described above, the present disclosure provides the method of adjusting the brightness of the display device. In the method of the present disclosure, the widths of the pulse waves of the pulse wave width modulation signal are modulated such that the display device can display different grayscale images under that condition that an internal frequency of the processor is not increased.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
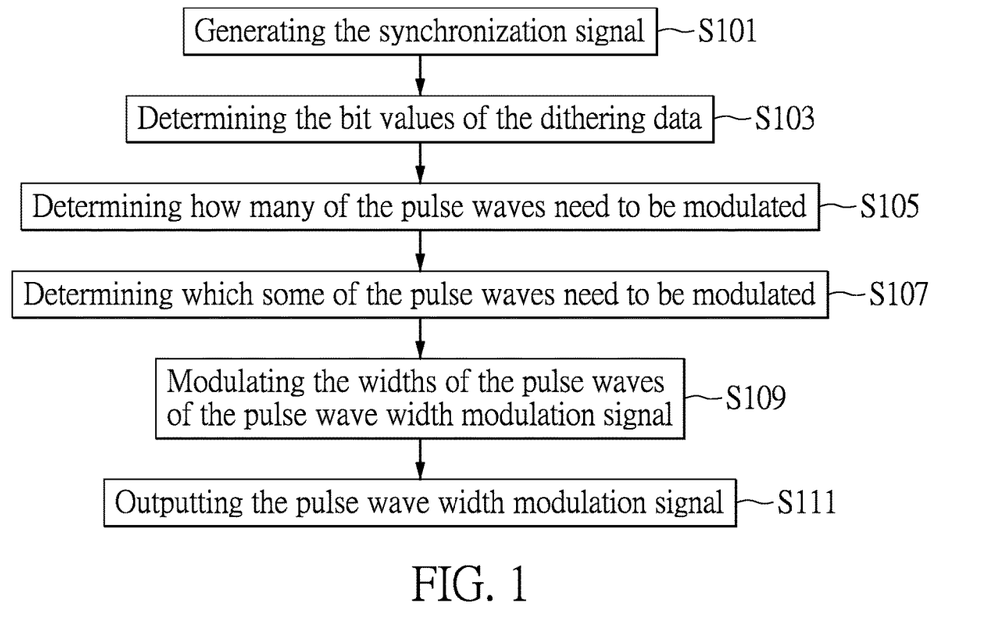
FIG. 1 is a flowchart diagram of steps of a method of adjusting brightness of a display device according to an embodiment of the present disclosure.
Figure 2:
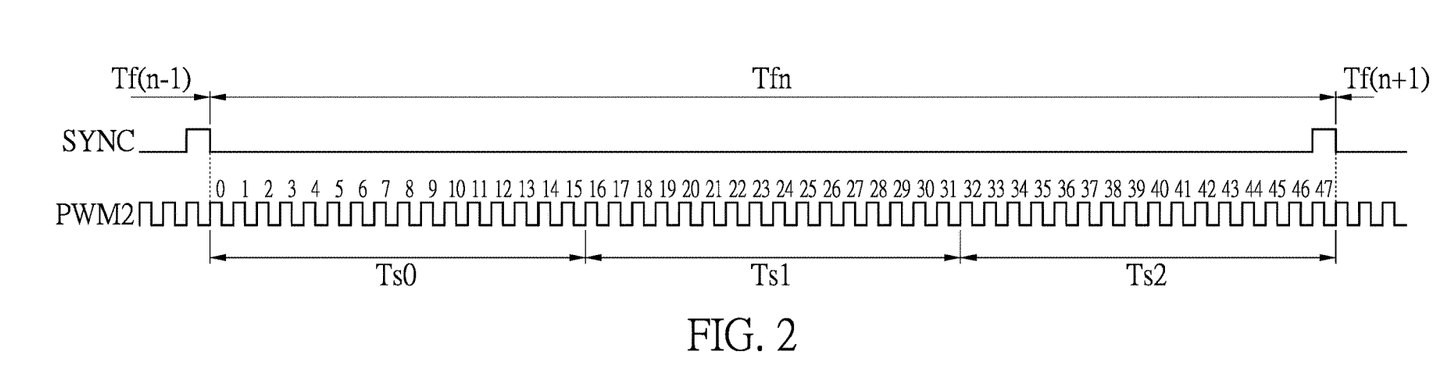
FIG. 2 is a waveform diagram of signals of the method of adjusting the brightness of the display device according to the embodiment of the present disclosure.
Figure 3:
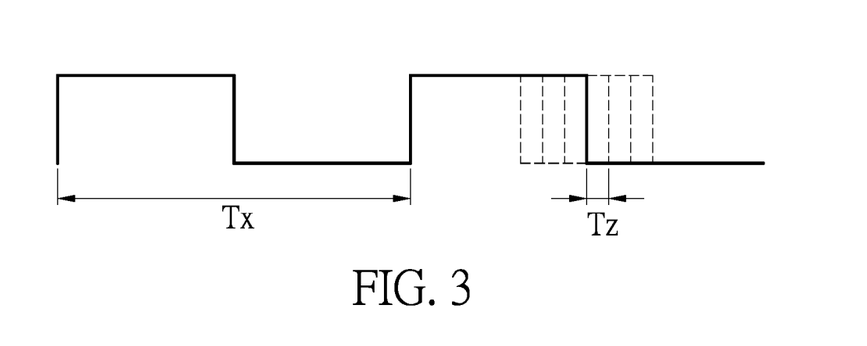
FIG. 3 is a waveform diagram of signals of the method of adjusting the brightness of the display device according to the embodiment of the present disclosure.
Figure 4:
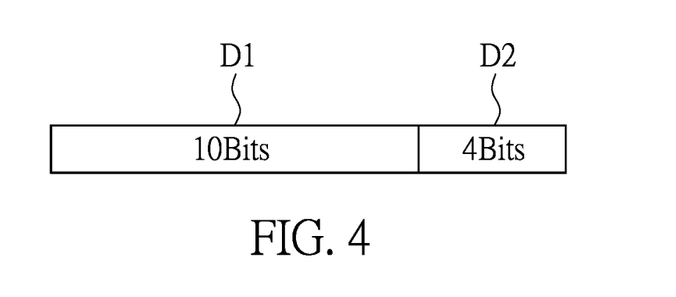
FIG. 4 is a schematic diagram of the number of bit values of data of the method of adjusting the brightness of the display device according to the embodiment of the present disclosure.

Reference is made to FIGS. 1 to 6, in which FIG. 1 is a flowchart diagram of steps of a method of adjusting brightness of a display device according to an embodiment of the present disclosure, FIGS. 2, 3, 5 and 6 are waveform diagrams of signals of the method of adjusting the brightness of the display device according to the embodiment of the present disclosure, and FIG. 4 is a schematic diagram of the number of bit values of data of the method of adjusting the brightness of the display device according to the embodiment of the present disclosure.

In the embodiment of the present disclosure, the method of adjusting brightness of the display device may include steps S101 to S111 as shown in FIG. 1.

In step S101, a synchronization signal is generated. Each of a plurality of periods of the synchronization signal is a frame time, such as but not limited to an nth frame time Tfn of a synchronization signal SYNC as shown in FIG. 2.

If necessary, before step S105 is performed, the following step may be performed: determining whether or not the number of pulse waves of the pulse wave width modulation signal within the frame time is larger than an integer multiple of $2^N$, wherein N represents the number of the bit values of the dithering data. If the number of pulse waves of the pulse wave width modulation signal within the frame time is larger than the integer multiple of $2^N$, the frame time is divided into a plurality of sub-frame times according to the number of the bit values of the dithering data. Conversely, if the number of pulse waves of the pulse wave width modulation signal within the frame time is larger than the integer multiple of $2^N$, the frame time is not divided into the plurality of sub-frame times.

For example, as shown in FIG. 4, the number of bit values of dithering data D2 is 4 bits. That is, N is equal to 4. Under this condition, it is determined whether or not the number of pulse waves of the pulse wave width modulation signal PWM2 within the nth frame time Tfn as shown in FIG. 2 is larger than $2^4$ (=16). If the nth frame time Tfn of the synchronization signal SYNC is 2.0833 ms (and a frequency of the synchronization signal SYNC is 480 HZ), the nth frame time Tfn "2.083 3 ms" is divided by 43.40208 us that is a period Tx of each of the pulse waves of the pulse wave width modulation signal to calculate "48" that is the number of pulse waves of the pulse wave width modulation signal within the frame time Tfn. Then, "48" that is the number of pulse waves within the frame time Tfn is divided by "16" to calculate "3" as the number of sub-frame times Ts0, Ts1 and Ts2 being divided from the frame time Tfn. The number of the pulse waves in each of the sub-frame times Ts0, Ts1 and Ts2 is 16.

If the display device is a 10-bit display device, the frequency of the synchronization signal SYNC such as 480 HZ is multiplied by "48" that is the number of pulse waves of the pulse wave width modulation signal within the frame time Tfn and is multiplied by "210" to calculate "23.59296 Mhz" Under this condition, an internal frequency of a processor only needs reach 23.59296 Mhz.

In step S103, the bit values of the dithering data are determined according to target brightness data. The target brightness data indicates brightness of an image needs to be displayed on the display device.

In step S105, how many pulse waves in the pulse wave width modulation signal need to be modulated within the frame time is determined, according to the bit values of the dithering data.

In step S107, it is determined which one or more of the wave pulses of the pulse wave width modulation signal need to be modulated, according to the bit values of dithering data and a sequence of the wave pulses of the pulse wave width modulation signal.

In the embodiment, it is determined that some of the wave pulses that appear one after another in the pulse wave width modulation signal need to be modulated. For example, the pulse waves that appear earlier in the pulse waves in the pulse wave width modulation signal need to be modulated, but the present disclosure is not limited thereto.

In step S109, widths of one or more of the pulse waves of the pulse wave width modulation signal are modulated.

In step S111, a driver of the display device drives a plurality of light-emitting diodes of a backlight circuit of the display device according to the pulse wave width modulation signal that is modulated.

Figure 5:
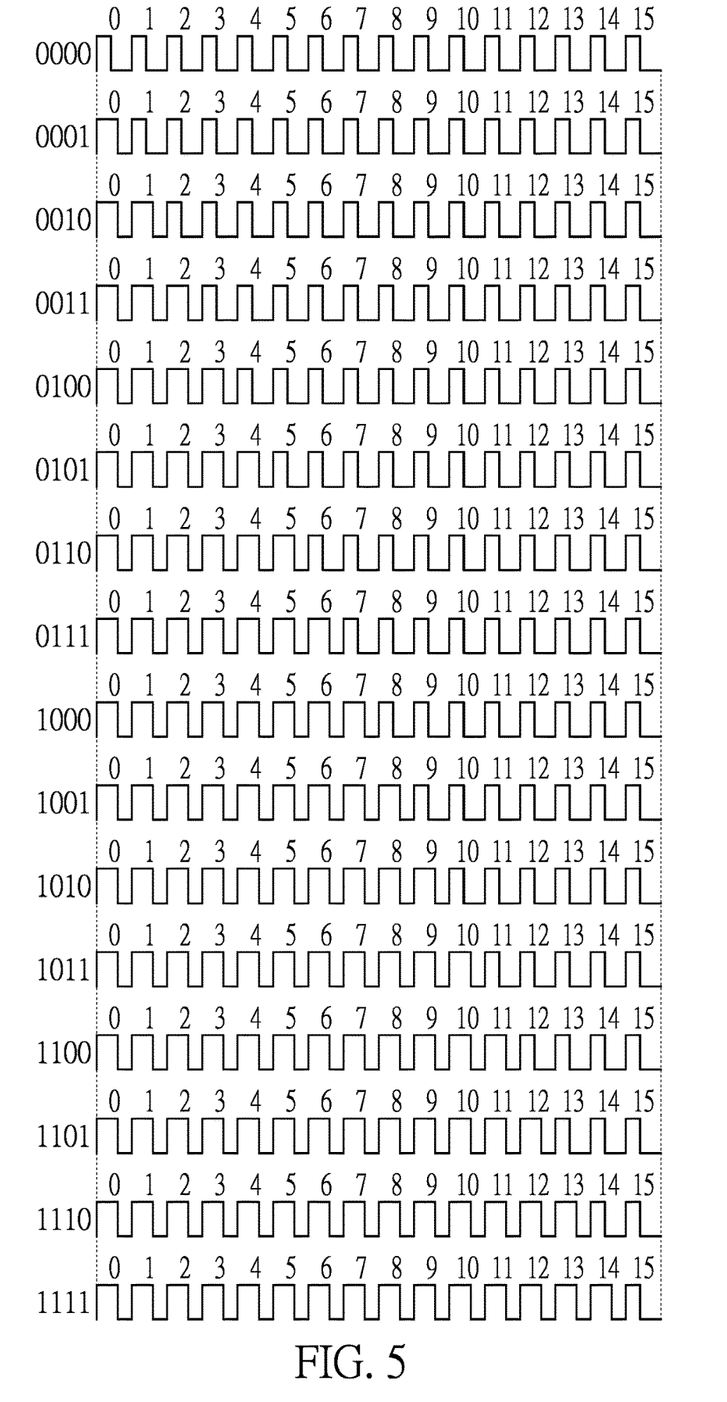
FIG. 5 is a waveform diagram of the signals of the method of adjusting the brightness of the display device according to the embodiment of the present disclosure.

For the convenience of description, in the embodiment, the number of the bit values of the dithering data D2 is 4 bits, but the present disclosure is not limited thereto. As shown in FIG. 5, if the number of the bit values of the dithering data D2 is 4 bits, the bit values of the dithering data D2 may be "0000", "0001", "0010", "0011", "0100", "0101", "0110", "0111", "1000", "1001", "1010", "1011", "1100", "1101", "1110" or "1111".

As shown in FIG. 5, when the bit values of the dithering data D2 are "0000", the widths of the plurality of pulse waves of the pulse wave width modulation signal are not modulated. That is, working periods of the plurality of pulse waves of the pulse wave width modulation signal are not modulated. Under this condition, the widths of the plurality of pulse waves of the pulse wave width modulation signal are the same and the width of each of the plurality of pulse waves is equal to a base width.

As shown in FIG. 5, when the bit values of the dithering data D2 are "0001", the width of one of the plurality of pulse waves of the pulse wave width modulation signal (within each of the plurality of sub-frame times) is modulated. That is, the working period of the one of the plurality of pulse waves of the pulse wave width modulation signal is modulated. For example, the width of (an earliest) one of the plurality of pulse waves of the pulse wave width modulation signal is increased. That is, the working period of the (earliest) one of the plurality of pulse waves is extended and a non-working period of the (earliest) one of the plurality of pulse waves is shortened, but an entirety of the period of the (earliest) one of the plurality of pulse waves is not modulated.

As shown in FIG. 5, when the bit values of the dithering data D2 are "0010", the widths of two ones of the plurality of pulse waves of the pulse wave width modulation signal (within each of the plurality of sub-frame times) are modulated. That is, the working periods of the two ones of the plurality of pulse waves of the pulse wave width modulation signal are modulated. For example, the widths of two (earlier) ones of the plurality of pulse waves of the pulse wave width modulation signal are increased. That is, the working periods of the two (earlier) ones of the plurality of pulse waves are extended and the non-working periods of the two (earlier) ones of the plurality of pulse waves are shortened, but the entirety of the period of each of the two (earlier) ones of the plurality of pulse waves are not modulated.

As shown in FIG. 5, when the bit values of the dithering data D2 are "0011", the widths of three ones of the plurality of pulse waves of the pulse wave width modulation signal (within each of the plurality of sub-frame times) are modulated. That is, the working periods of the three ones of the plurality of pulse waves of the pulse wave width modulation signal are modulated. For example, the widths of three (earlier) ones of the plurality of pulse waves of the pulse wave width modulation signal are increased. That is, the working periods of the three (earlier) ones of the plurality of pulse waves are extended and the non-working periods of the three (earlier) ones of the plurality of pulse waves are shortened, but the entirety of the period of each of the three (earlier) ones of the plurality of pulse waves are not modulated.

As shown in FIG. 5, when the bit values of the dithering data D2 are "0100", the widths of four ones of the plurality of pulse waves of the pulse wave width modulation signal (within each of the plurality of sub-frame times) are modulated. That is, the working periods of the four ones of the plurality of pulse waves of the pulse wave width modulation signal are modulated. For example, the widths of four (earlier) ones of the plurality of pulse waves of the pulse wave width modulation signal are increased. That is, the working periods of the four (earlier) ones of the plurality of pulse waves are extended and the non-working periods of the four (earlier) ones of the plurality of pulse waves are shortened, but the entirety of the period of each of the four (earlier) ones of the plurality of pulse waves are not modulated.

As shown in FIG. 5, when the bit values of the dithering data D2 are "0101", the widths of five ones of the plurality of pulse waves of the pulse wave width modulation signal (within each of the plurality of sub-frame times) are modulated. That is, the working periods of the five ones of the plurality of pulse waves of the pulse wave width modulation signal are modulated. For example, the widths of five (earlier) ones of the plurality of pulse waves of the pulse wave width modulation signal are increased. That is, the working periods of the five (earlier) ones of the plurality of pulse waves are extended and the non-working periods of the five (earlier) ones of the plurality of pulse waves are shortened, but the entirety of the period of each of the five (earlier) ones of the plurality of pulse waves are not modulated.

As shown in FIG. 5, when the bit values of the dithering data D2 are "0110", the widths of six ones of the plurality of pulse waves of the pulse wave width modulation signal (within each of the plurality of sub-frame times) are modulated. That is, the working periods of the six ones of the plurality of pulse waves of the pulse wave width modulation signal are modulated. For example, the widths of six (earlier) ones of the plurality of pulse waves of the pulse wave width modulation signal are increased. That is, the working periods of the six (earlier) ones of the plurality of pulse waves are extended and the non-working periods of the six (earlier) ones of the plurality of pulse waves are shortened, but the entirety of the period of each of the six (earlier) ones of the plurality of pulse waves are not modulated.

As shown in FIG. 5, when the bit values of the dithering data D2 are "0111", the widths of seven ones of the plurality of pulse waves of the pulse wave width modulation signal (within each of the plurality of sub-frame times) are modulated. That is, the working periods of the seven ones of the plurality of pulse waves of the pulse wave width modulation signal are modulated. For example, the widths of seven (earlier) ones of the plurality of pulse waves of the pulse wave width modulation signal are increased. That is, the working periods of the seven (earlier) ones of the plurality of pulse waves are extended and the non-working periods of the seven (earlier) ones of the plurality of pulse waves are shortened, but the entirety of the period of each of the seven (earlier) ones of the plurality of pulse waves are not modulated.

As shown in FIG. 5, when the bit values of the dithering data D2 are "1000" the widths of eight ones of the plurality of pulse waves of the pulse wave width modulation signal (within each of the plurality of sub-frame times) are modulated. That is, the working periods of the eight ones of the plurality of pulse waves of the pulse wave width modulation signal are modulated. For example, the widths of eight (earlier) ones of the plurality of pulse waves of the pulse wave width modulation signal are increased. That is, the working periods of the eight (earlier) ones of the plurality of pulse waves are extended and the non-working periods of the eight (earlier) ones of the plurality of pulse waves are shortened, but the entirety of the period of each of the eight (earlier) ones of the plurality of pulse waves are not modulated.

As shown in FIG. 5, when the bit values of the dithering data D2 are "1001", the widths of nine ones of the plurality of pulse waves of the pulse wave width modulation signal (within each of the plurality of sub-frame times) are modulated. That is, the working periods of the nine ones of the plurality of pulse waves of the pulse wave width modulation signal are modulated. For example, the widths of nine (earlier) ones of the plurality of pulse waves of the pulse wave width modulation signal are increased. That is, the working periods of the nine (earlier) ones of the plurality of pulse waves are extended and the non-working periods of the nine (earlier) ones of the plurality of pulse waves are shortened, but the entirety of the period of each of the nine (earlier) ones of the plurality of pulse waves are not modulated.

As shown in FIG. 5, when the bit values of the dithering data D2 are "1010", the widths of ten ones of the plurality of pulse waves of the pulse wave width modulation signal (within each of the plurality of sub-frame times) are modulated. That is, the working periods of the ten ones of the plurality of pulse waves of the pulse wave width modulation signal are modulated. For example, the widths of ten (earlier) ones of the plurality of pulse waves of the pulse wave width modulation signal are increased. That is, the working periods of the ten (earlier) ones of the plurality of pulse waves are extended and the non-working periods of the ten (earlier) ones of the plurality of pulse waves are shortened, but the entirety of the period of each of the ten (earlier) ones of the plurality of pulse waves are not modulated.

As shown in FIG. 5, when the bit values of the dithering data D2 are "1011", the widths of eleven ones of the plurality of pulse waves of the pulse wave width modulation signal (within each of the plurality of sub-frame times) are modulated. That is, the working periods of the eleven ones of the plurality of pulse waves of the pulse wave width modulation signal are modulated. For example, the widths of eleven (earlier) ones of the plurality of pulse waves of the pulse wave width modulation signal are increased. That is, the working periods of the eleven (earlier) ones of the plurality of pulse waves are extended and the non-working periods of the eleven (earlier) ones of the plurality of pulse waves are shortened, but the entirety of the period of each of the eleven (earlier) ones of the plurality of pulse waves are not modulated.

As shown in FIG. 5, when the bit values of the dithering data D2 are "1100", the widths of twelve ones of the plurality of pulse waves of the pulse wave width modulation signal (within each of the plurality of sub-frame times) are modulated. That is, the working periods of the twelve ones of the plurality of pulse waves of the pulse wave width modulation signal are modulated. For example, the widths of twelve (earlier) ones of the plurality of pulse waves of the pulse wave width modulation signal are increased. That is, the working periods of the twelve (earlier) ones of the plurality of pulse waves are extended and the non-working periods of the twelve (earlier) ones of the plurality of pulse waves are shortened, but the entirety of the period of each of the twelve (earlier) ones of the plurality of pulse waves are not modulated.

As shown in FIG. 5, when the bit values of the dithering data D2 are "1101", the widths of thirteen ones of the plurality of pulse waves of the pulse wave width modulation signal (within each of the plurality of sub-frame times) are modulated. That is, the working periods of the thirteen ones of the plurality of pulse waves of the pulse wave width modulation signal are modulated. For example, the widths of thirteen (earlier) ones of the plurality of pulse waves of the pulse wave width modulation signal are increased. That is, the working periods of the thirteen (earlier) ones of the plurality of pulse waves are extended and the non-working periods of the thirteen (earlier) ones of the plurality of pulse waves are shortened, but the entirety of the period of each of the thirteen (earlier) ones of the plurality of pulse waves are not modulated.

As shown in FIG. 5, when the bit values of the dithering data D2 are "1110", the widths of fourteen ones of the plurality of pulse waves of the pulse wave width modulation signal (within each of the plurality of sub-frame times) are modulated. That is, the working periods of the fourteen ones of the plurality of pulse waves of the pulse wave width modulation signal are modulated. For example, the widths of fourteen (earlier) ones of the plurality of pulse waves of the pulse wave width modulation signal are increased. That is, the working periods of the fourteen (earlier) ones of the plurality of pulse waves are extended and the non-working periods of the fourteen (earlier) ones of the plurality of pulse waves are shortened, but the entirety of the period of each of the fourteen (earlier) ones of the plurality of pulse waves are not modulated.

As shown in FIG. 5, when the bit values of the dithering data D2 are "1111", the widths of fifteen ones of the plurality of pulse waves of the pulse wave width modulation signal (within each of the plurality of sub-frame times) are modulated. That is, the working periods of the fifteen ones of the plurality of pulse waves of the pulse wave width modulation signal are modulated. For example, the widths of fifteen (earlier) ones of the plurality of pulse waves of the pulse wave width modulation signal are increased. That is, the working periods of the fifteen (earlier) ones of the plurality of pulse waves are extended and the non-working periods of the fifteen (earlier) ones of the plurality of pulse waves are shortened, but the entirety of the period of each of the fifteen (earlier) ones of the plurality of pulse waves are not modulated.

As shown in FIG. 5, the width of each of the pulse waves that are modulated as described above is larger than the base width that is the width of each of the pulse waves that are not modulated. The modulated widths of the pulse waves are the same. That is, the modulated working periods of the pulse waves are the same, but the present disclosure is not limited thereto.

In practice, each of the periods of the pulse wave width modulation signal may be divided by a value of resolution data to calculate a dithering time. Then, the widths of one or more of the plurality of pulse waves of the pulse wave width modulation signal may be modulated based on the dithering time. That is, the dithering time may be added to the working period of each of the wave pluses that need to be modulated in the pulse wave width modulation signal such that the working periods of the wave pluses are extended.

Specifically, the period of each of the pulse wave of the pulse width modulation signal PWM2 as shown in FIG. 2 is represented by Tx as shown in FIG. 3. The number of the bit values of the resolution data is Nbits and $2^N$ is calculated as the value of the resolution data. Then, the period Tx of each of the pulse waves of the pulse width modulation signal PWM2 is divided by the value of resolution data that is equal to $2^N$ to calculate the dithering time.

For example, as shown in FIG. 4, the number of bit values resolution data D1 is 10 bits and the period Tx of each of the pulse waves of the pulse width modulation signal PWM2 is 2048 ms, "210" is calculated to obtain "1024", and then "2048 ms" is divided by "1024" to calculate 2 ms as the dithering time. Then, the dithering time of 2 ms is added to the working period of each of the wave pluses that need to be modulated in the pulse width modulation signal PWM2 such that the working periods of the wave pluses of the pulse wave width modulation signal PWM2 is extended.

Figure 6:
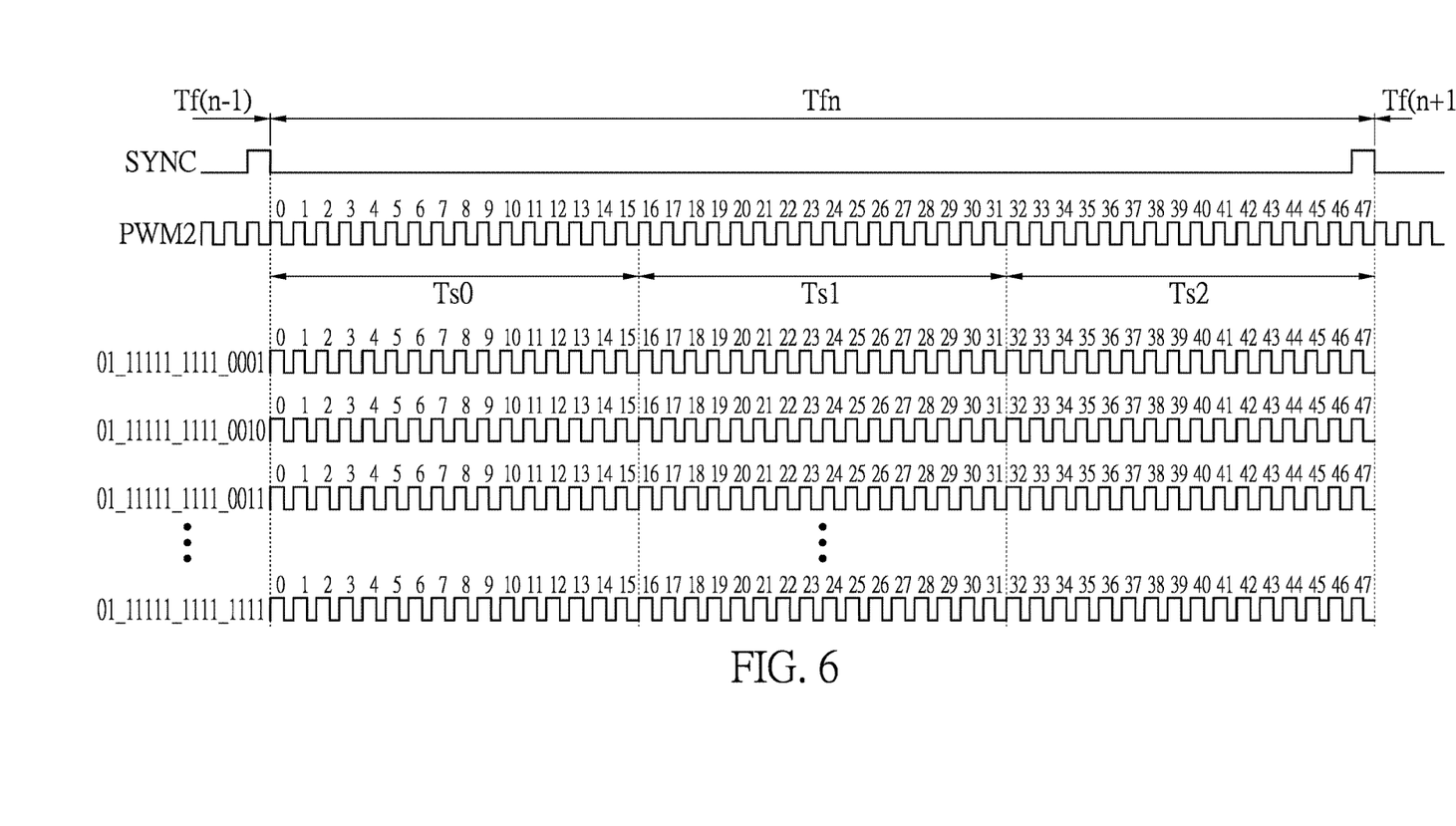
FIG. 6 is a waveform diagram of the signals of the method of adjusting the brightness of the display device according to the embodiment of the present disclosure.

As shown in FIG. 6, modulation performed on the pulse waves within the sub-frame time Ts0 may be the same as that performed on the pulse waves within the sub-frame time Ts1 next to the sub-frame time Ts0. That is, the pulse waves within the sub-frame time Ts1 may be modulated according to the modulation performed on the pulse waves within the sub-frame time Ts0.

In summary, the present disclosure provides the method of adjusting the brightness of the display device. In the method of the present disclosure, the widths of the pulse waves of the pulse wave width modulation signal are modulated such that the display device can display different grayscale images under that condition that the internal frequency of the processor is not increased.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method of adjusting brightness of a display device, comprising the following steps:
    generating a synchronization signal, wherein each of a plurality of periods of the synchronization signal is a frame time;
    determining bit values of dithering data according to target brightness data;
    determining a number of pulse waves in a pulse wave width modulation signal that are to be modulated within the frame time according to the bit values of the dithering data, and accordingly modulating widths of the pulse waves of the pulse wave width modulation signal; and
    driving one or more of a plurality of light-emitting components of the display device according to the pulse wave width modulation signal by a driver of the display device.

2. The method according to claim 1, further comprising the following steps:
    determining whether or not the number of pulse waves of the pulse wave width modulation signal within the frame time is larger than an integer multiple of $2^N$, wherein N represents the number of the bit values of the dithering data, in response to determining that the number of pulse waves of the pulse wave width modulation signal within the frame time is not larger than the integer multiple of $2^N$, not performing the following steps, and in response to determining that the number of pulse waves of the pulse wave width modulation signal within the frame time is larger than the integer multiple of $2^N$, performing the following steps;
    dividing the frame time into a plurality of sub-frame times according to the number of the bit values of the dithering data; and
    determining how many pulse waves in the pulse wave width modulation signal need to be modulated within each of the plurality of sub-frame times according to the bit values of the dithering data.

3. The method according to claim 2, further comprising the following step:
    after modulation is performed on part of the wave pulses of the pulse wave width modulation signal within a previous one of the plurality of sub-frame times, modulating another part of the pulse waves of the pulse wave width modulation signal within a next one of the plurality of sub-frame times according to the modulation performed within the previous one of the plurality of sub-frame times.

4. The method according to claim 1, further comprising the following steps:
    dividing a period of the pulse wave width modulation signal by a value of resolution data to calculate a dithering time; and
    modulating the widths of one or more of the pulse waves of the pulse wave width modulation signal according to the dithering time.

5. The method according to claim 4, further comprising the following step:
    extending a working period of each of the wave pulses that are to be modulated in the pulse wave width modulation signal by adding the dithering time to the working period of each of the wave pulses that need to be modulated.

6. The method according to claim 1, further comprising the following step:
    determining which one or more of the wave pulses of the pulse wave width modulation signal need to be modulated, according to the bit values of dithering data and a sequence of the wave pulses of the pulse wave width modulation signal.

7. The method according to claim 1, further comprising the following step:
    determining to modulate some of the wave pulses that appear one after another in the pulse wave width modulation signal.

* * * * *